United States Patent [19]

Pedersen

[11] Patent Number: 5,442,876
[45] Date of Patent: Aug. 22, 1995

[54] METHOD FOR PREVENTING AND COMBATING FUNGUS ATTACK IN EXISTING BUILDING STRUCTURES AND ELECTRODES FOR CARRYING OUT THE METHOD

[76] Inventor: Ib O. Pedersen, 4, Skolebakken, Gentofte DK-2820, Denmark

[21] Appl. No.: 133,044
[22] PCT Filed: Apr. 9, 1992
[86] PCT No.: PCT/DK92/00112
 § 371 Date: Oct. 12, 1993
 § 102(e) Date: Oct. 12, 1993
[87] PCT Pub. No.: WO92/18716
 PCT Pub. Date: Oct. 29, 1992

[30] Foreign Application Priority Data

Apr. 9, 1991 [DK] Denmark ............... 622/91

[51] Int. Cl.6 ........................... A01M 1/20
[52] U.S. Cl. .................... 43/124; 43/132.1; 43/107
[58] Field of Search ......... 43/124, 132.1, 112, 43/107, 140, 144

[56] References Cited

U.S. PATENT DOCUMENTS

| | | | |
|---|---|---|---|
| 2,586,328 | 2/1952 | Hagohian | 219/47 |
| 3,322,623 | 5/1967 | Doakley | 43/132.1 |
| 4,817,329 | 4/1989 | Forbes | 43/124 |
| 5,058,313 | 10/1991 | Tallon | 43/124 |
| 5,196,823 | 3/1993 | Formigoni | 43/124 |
| 5,210,719 | 5/1993 | Lawrence | 43/132.1 |
| 5,339,564 | 8/1994 | Wilson | 43/107 |

FOREIGN PATENT DOCUMENTS

| | | | |
|---|---|---|---|
| 855331 | 11/1952 | Germany . | |
| 937200 | 12/1955 | Germany . | |
| 1033887 | 7/1958 | Germany . | |
| 936502 | 1/1970 | Germany . | |
| 2800517 | 7/1978 | Germany | 43/124 |
| 3939269 | 5/1991 | Germany | 43/124 |
| 3139236 | 6/1991 | Japan | 43/124 |
| 60625 | 12/1937 | Norway . | |
| 412878 | 3/1980 | Sweden . | |

*Primary Examiner*—Mark Rosenbaum
*Assistant Examiner*—James Miner
*Attorney, Agent, or Firm*—Lowe, Price, LeBlanc & Becker

[57] ABSTRACT

A method for preventing and combating attacks of fungus and of other harmful living organisms, such as longicorn beetles and wood worm in existing building structures, by heating the attacked areas to temperatures lethal to living organisms by means of electromagnetic energy. A HF generator comprising a balanced output communicating with a plurality of electrodes is arranged relative to the attacked area of the building in such a manner that the electrodes in combination form a capacitor, wherein at least a part of the attacked area completely or partially constitutes the dielectric of the capacitor, whereafter the HF generator is activated, said generator operating at a frequency within in a frequency range from 3 to 20 MHz, in particular from 10 to 15 MHz, and more preferred from 13 to 14 MHz, most preferred 13.56 MHz to provide a HF power heating the area between the electrodes to a temperature lethal to living organisms.

7 Claims, 4 Drawing Sheets

METHOD FOR PREVENTING AND COMBATING FUNGUS ATTACK IN EXISTING BUILDING STRUCTURES AND ELECTRODES FOR CARRYING OUT THE METHOD

TECHNICAL FIELD

The present invention relates to a method for preventing and combating fungus attack, in particular of dry rot (Merylius lacrymans), and/or other harmful living organisms, such as longicorn beetles, wood worm, and the like in existing building structures, said method comprises arranging a high frequency (HF) generator adjacent to the area attacked of the building structure which remains in place in the existing building, connecting a number of electrodes to the HF generator through HF supply lines, adapting and activating the HF-generator (12) to supply a sufficiently strong HF-power (kW) being dissipated in the treated area (20) of the building structure, thereby heating the attacked area by means of electromagnetic energy to temperatures lethal to living organisms, and maintaining the high temperature for a predetermined period of time, (for instance at least 1 minute). The method is generally applicable to building structures, but is developed for use in old houses, in particular.

BACKGROUND ART

It has been common practice for many years at attack of dry rot in buildings to replace all of the woodwork in which dry rot has been detected. This is obviously an expensive procedure, if the attack is extensive.

Attempts have previously been made to avoid such a replacement by exterminating living organisms, such as vermin, plants and/or microorganisms causing the destruction of the woodwork, by treatment with electromagnetic waves.

DE patent No. 855 331 thus discloses how to treat the attacked woodwork or brick work by means of so-called HF or UHF radiation, whereby the harmful organisms (vermin or plants) are killed. It appears from the publication and the pertaining drawings that UHF or rather microwave radiation is used by the method in question and that the woodwork is exposed to microwave radiation.

DE patent No. 937 200 discloses a method for the extermination of vermin or vegetation harmful to wood in building structures, and in particular dry rot, whereby a new attack also is prevented. By the method described through-going holes are drilled in the structural parts and heating cartridges are inserted heating the structural parts by means of electrical resistance heating, whereafter the boreholes are filled with a chemical preservative.

DE 1 936 502 also discloses a method for the extermination of harmful organisms in buildings, whereby the attacked area of the building is heated by means of microwave energy from an energy source placed within the attacked area. The energy source may be magnetron. It is stated that a temperature of approximately 40° C. sustained for 10 minutes is sufficient to exterminate dry rot and a temperature of 65° C. sustained for 1 minute is sufficient to exterminate woodworm.

Furthermore, it is known to wrap up the entire building in a dense material and then keep the house heated at a very high temperature—about 50° C.—for one or several days.

However, this method is very expensive, partially due to the costs in connection with the mounting and dismounting of the insulation around the house and the mere heating and partially due to the damage, which the intensive and prolonged heating may sustain to the other materials and contents of the house. Thus, the household effects have to be removed to a great extent to avoid damage during the heating.

Furthermore, it is known from SE published specification 412 878 to heat woodwork to be preserved with chemical wood preservatives by radiating the woodwork with electromagnetic waves. However, the object of the method is to provide an improved penetration and dispersion of the chemical preservative.

Moreover, it is known to heat wood by means of HF generators, whereby so-called capacitive high-frequency stationary systems are used for drying and heating of a range of non-metallic materials, in particular for drying of wood, yarns, for glueing of furniture and bookbinding articles, for drying of sand cores in foundries, and for welding of plastics.

Furthermore, it is known to expose living tissue to electromagnetic radiation to combat pathogenic or morbid growths such as cancer.

DISCLOSURE OF THE INVENTION

By the present invention an attack of fungus and the like, in particular of dry rot in existing building structures is combatted by means of a method of the type stated in the opening paragraph characterised in that the electrodes are plate electrodes (16, 18) arranged on either side of the attacked area of the building structure of part thereof in such a manner that the electrodes in combination form one or more capacitors, whereby at least part of the attacked area of the building structure completely or partially constitutes the dielectric of the capacitor or capacitors, applying one or more frequencies within a frequency range from 3 to 20 MHz, particularly 10 to 15 MHz and more preferred from 13 to 14 MHz, most preferred 13,56 MHz, and that said area is heated to approximately 50° C. within a few minutes.

A particularly effective heating is obtained by means of the use of a HF current, as woodwork as well as wellings and concrete can be heated by means of high frequency. Whereas it is necessary by the traditional methods to heat a thick beam for several hours to ensure that the temperature in the centre thereof has reached the desired value, a temperature of for instance 50° C. is reached within a few minutes by means of a HF current.

The total heat energy to be supplied to exterminate the harmful organisms is generally considerably lower by the method according to the invention than by the known methods. A rapid heating to for instance 70° C. exterminates all living organisms within a few minutes, whereas heating to 50° C. is to be maintained for at least 1 hour and heating to about 45° C. is to be maintained for at least 24 hours to obtain the same effect. It is true that at these lower temperatures the difference in temperature to the ambience is correspondingly lower, but as the heating time is considerably longer, it is evident that the total heat loss to the ambience (added up for the entire processing time) is more substantial by a slow treatment at a low temperature than by a rapid treatment at a high temperature.

The HF treatment is particularly advantageous by the rapid heating, as the heating is effected due to the dielectric losses and thus takes place equally in the centre of the material as at the surface hereof. Most other heating methods are dependent on the heat per se spreading into the material by means of heat conduction. This is a very slow proces, particularly in wood being a rather poor thermal conductor.

Moreover, the temperature is normally somewhat higher in the centre of the beam, as the heat loss to the ambience only takes place from the outer surface, whereas the heating takes place in the entire cross section of the beam. By HF heating it is further possible to heat the building structure to considerably higher temperatures, if necessary above 100° C. and even up to 150° C. or more, of course taking the durability of the material in question into consideration.

This method is also cheaper in use than the methods hitherto known, as only the attacked areas of the house need be heated.

Another advantage of the method is that it is carried out faster than the methods known. Relatively large areas may be treated concurrently and the method is usable for small as well as large areas.

The frequency range preferred by the invention enables the use of HF generators of a known type providing a fairly large power relative to the weight of the generator and the power consumption thereof—two factors of great importance when the equipment is to be transported to and mounted temporarily at a local site of use, typically an old house, wherein access to the attacked area may be complicated.

Preferably, the HF field produced has a power (typically from 5 to 100 kW), whereby the treated area is heated briefly to at least 50° C. within a few minutes, and preferably to a temperature between 50° C. and 80° C., a temperature of 70° C. being most preferred and said high temperature preferably being maintained for at least 1 minute, more preferred between 2 to 10 minutes, and most preferred between 3 to 5 minutes. Generally it can be said that the higher temperature, the shorter the processing time. The temperature then slowly decreases due to the emission of heat to the ambience, but due the poor thermal conductivity, particularly in woodwork, the temperature typically remains above 50° C. for over 1 hour subsequent to a through-going heating to 70° C.

By an advantageous method according to the invention the HF generator comprises a balanced output communicating with two essentially identical electrodes through HF supply lines, the form and dimensions of said electrodes adapted to cover at least part of the building structure requiring treatment and further adapted to provide the best possible impedance matching with the HF generator.

It is within the scope of the present invention to use a generator comprising an unbalanced output communicating with electrodes being mutually varying.

For the treatment of a beam rectangular plate electrodes are used arranged at either side of the beam in such a manner that the applied HF field extends from one electrode to the other passing straight through the beam to be treated.

At more substantial attacks, sections of the attacked area are treated in turn, until the entire area attacked has been treated. At such a successive treatment it is advantageous to ensure that the sections treated overlap one another.

By the treatment of a wall or a partition the electrodes may advantageously be rectangular plate electrodes arranged on the same side of the wall or partition requiring treatment, a third conducting plate being arranged on the opposite side of the wall or partition, said conducting plate not being galvanically connected to the generator, but cooperating with the two electrodes, and being arranged exactly opposite the two electrodes, whereby only the wall or partition requiring treatment separates the third plate from the two electrodes. As a result, the electrodes are easily connected to the generator, and it is easy for the operator to change the placing of the electrodes, as the treatment progresses.

Furthermore, the method according to the invention may be used for drying of moist sections of building structures for the prevention of rot and the like.

Moreover, the invention relates to a set of electrodes and an electrode assembly for carrying out the method as defined in the claims 7 to 10. A set of electrodes to be used for carrying out the method according to the invention comprises a preferred embodiment of two essentially identical electrically conducting plates, the extent and dimensions of which are adapted to cover at least part of the building structure requiring treatment and adapted to be connected through flat, wide rippon conductors to the terminals of a HF generator. By using electrodes designed to cover as large an area as practically useful, the treatment of the building is executed as fast and efficiently as possible.

BRIEF DESCRIPTION OF THE DRAWINGS

The invention will be described below in details by means of examples with reference to the accompaying drawing, in which.

BEST MODE FOR CARRYING OUT THE INVENTION

When an attacked area of a building is to be treated, an equipment (10) comprising a powerful HF generator (12) and at least one set of electrodes (16,18) is transported to the attacked place. The electrodes (16,18) are arranged in such a manner that they form a capacitor, wherein the attacked woodwork, brick work or concrete layer constitutes the dielectric located within the capacitive field applied by the HF generator (12).

Figure 2:
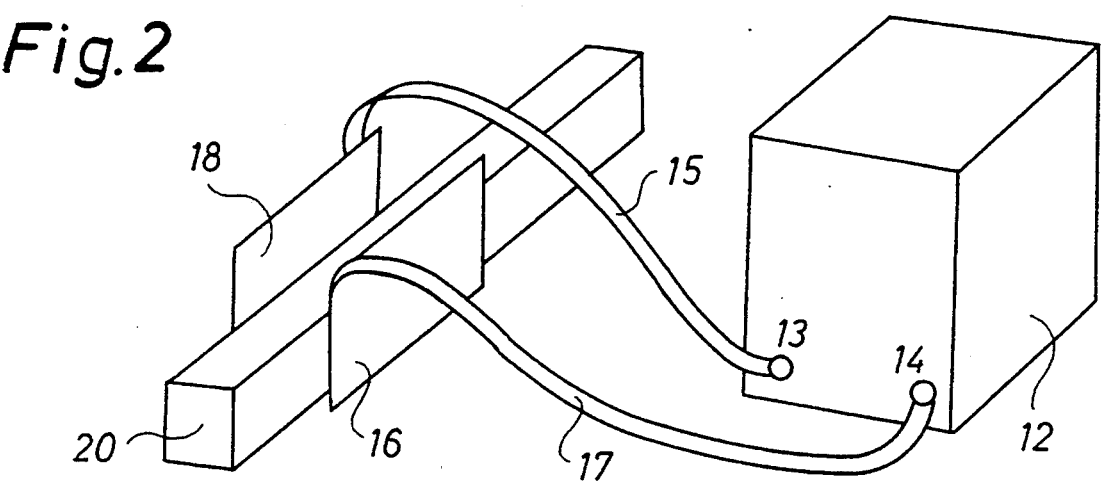
FIG. 2 is an Example of the arrangement of two HF electrodes and a HF generator connected thereto.

As it appears from FIG. 2 of the drawing, the two electrodes are essentially identical and accordingly, a HF generator comprising balanced output terminals is used. The exact form and arrangement of the electrodes are adapted so as to provide an essential impedance matching between the generator and the load. This problem is well-known to persons skilled in the art and shall not be discussed further in the present application.

A generator operating at a frequency of approximately 13.56 MHz and providing an output power of about 8 kW is used for carrying out the method. The operating time of the generator to heat the attacked woodwork of course depends on the dimensions the attacked woodwork, the ambient temperature and the moisture content in the wood. The equipment is preferably provided with a time relay, which typically may be adjusted for instance from 0 to 5 minutes. In another embodiment the equipment may advantageously comprise one or more temperature sensors connected to a control or regulating section disconnecting the generator when the desired temperature has been reached.

Figure 1:
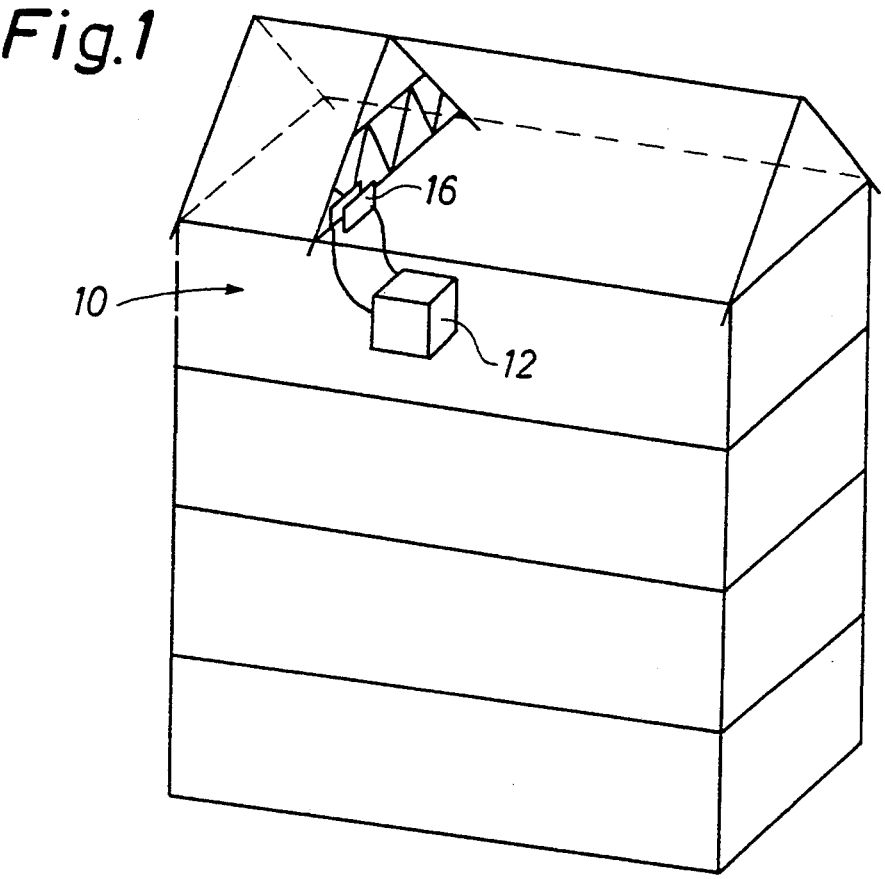
FIG. 1 illustrates a multi-storeyed building attacked by fungus, wherein a HF generator is arranged provided with electrodes for carrying out the method according to the invention.

The arrangement illustrated in FIG. 1 is made on the assumption that a fungus attack has been found in part of the roof construction of a four-storeyed building. The generator is arranged at a position, wherefrom the attacked part of the roof construction is accessible.

The preferred heating electrodes comprise two electrode plates (16,18) normally arranged on either side of the woodwork (20) to be treated, as illustrated in FIG. 2.

The electrodes (16,18) are then connected to the terminals (13,14) of the generator, preferably by means of wide, flexible ribbon conductors (15,17) made from cobber, brass, aluminium or alloys thereof suitable for conducting HF currents due to the large surfaces thereof. Evidently, the connecting ribbons between the generator and the electrode system should be as short as possible. However, the actual length of the ribbons depends on the accessibility of the area requiring treatment.

The electrode plates may be shaped as rectangular plates typically being about 200 to 300 mm wide and about 2 m long. The form and the dimensions of the electrodes may advantageously be adapted to the dimensions of the building structure requiring treatment, for instance a beam. Taking into consideration that there may be places, where the long electrode plates cannot be arranged due to the lack of space, it is advantageous to have an additional set of electrodes being somewhat shorter.

It is possible to treat all of the building structures requiring treatment within a short period of time by means of the long electrodes. The building structure may be heated to 70° C. within a few minutes by means of the electrodes and the associated generator of the invention. By continuing the power supply for a couple of minutes (2 to 5 minutes) all living organisms between the electrodes are exterminated with certainty. The electrodes are then moved to the next area requiring treatment. Moreover, due to the poor thermal conductivity of the wood the temperature in the area treated remains high for a considerable time and possibly the temperature does not fall below 55° C. until an hour subsequent to treatment. Of course this depends on the ambient temperature and ventilation in the area in question.

Figure 3:
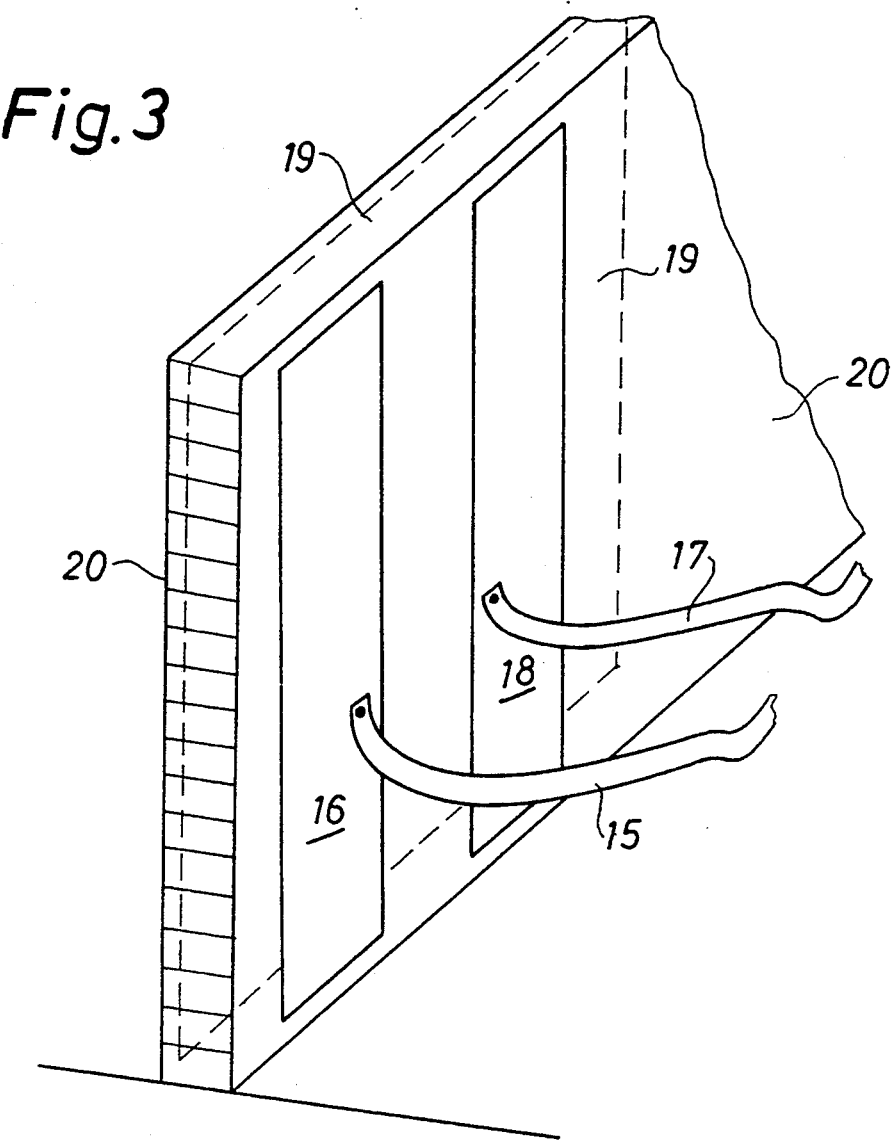
FIG. 3 illustrates an alternative arrangement of the electrodes.

In some case at the treatment of a wall, the use of an electrode arrangement similar to the one shown in FIG. 2 with one electrode on either side of the wall makes it difficult to obtain an electric connection to both of the electrodes. In such cases it is advantageous to use the electrode arrangement illustrated in FIG. 3, wherein the two electrodes (16,18) cooperate with an auxiliary plate (19) arranged behind the wall (20) to be treated.

Figure 4:
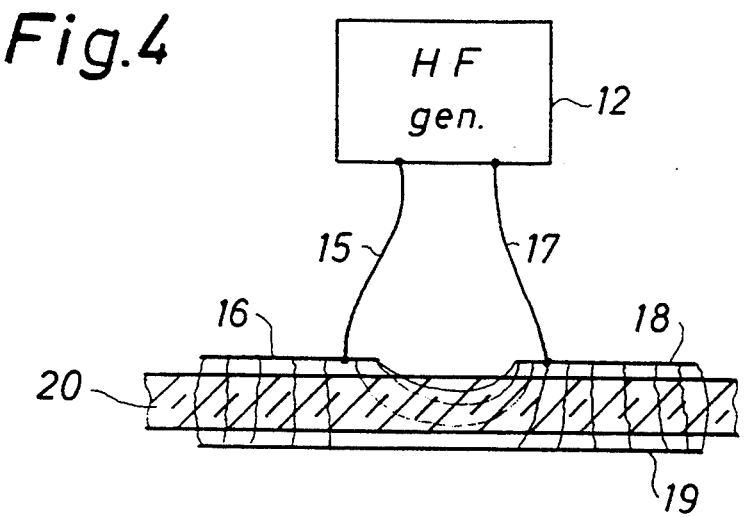
FIG. 4 is a sectional view through the wall of FIG. 3.

Preferably the size of the auxiliary plate (19) is such that it covers the wall (20) in its full height and in a considerable width thereof, whereby the operator in most cases only need to move the two electrodes (16,18) connected to the generator (12). Consequently, no wall duct for a HF supply line is needed, or an alternative use of a very long HF supply line to be led around the "obstructions" and for instance through a door is avoided. By means of this solution, shown in FIG. 3 and shown in a sectional view in FIG. 4, the two electrodes and the auxiliary plate form two capacitors connected in series, viz. a first capacitor between the first electrodes (16) and the auxiliary plate (19) and a second capacitor between the auxiliary plate (19) and the other electrode (18).

Experience has taught that the thickness of the wall should be limited to about 70 mm, when using the preferred generator operating at a frequency of 13.56 MHz and the tested electrodes. However, at wall thicknesses of more than 70 mm, the treatment may advantageously be repeated from the other side of the wall, whereby the width of the treated building structure should not exceed 2×70 mm.

Figure 5:
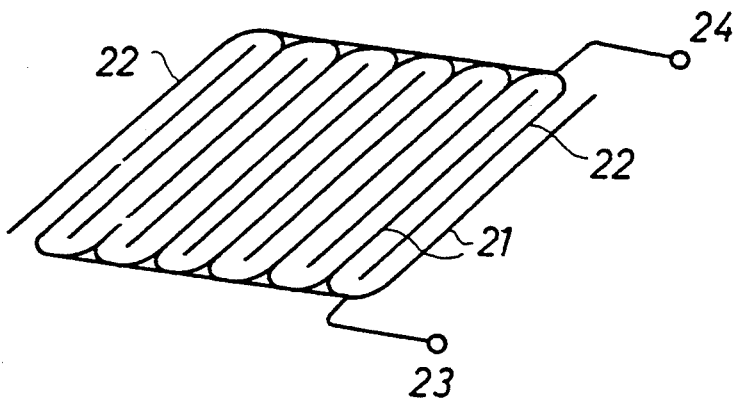
FIG. 5 is an Example of an electrode assembly.

In yet another embodiment of the invention the set of electrodes may advantageously comprise a so-called "festoon" electrode comprising two electrodes forming a series of parallel rods (21) mutually connected in such a way that half of the rods, that is every second rod, are connected to a first terminal (23) which is connectable to a terminal of the HF generator by means of a ribbon conductor, and the other half of the rods, that is the intermediate rods, are connected to another terminal (24) of the HF generator, for instance as shown in FIG. 5. The spacings between the rods are typically from 20 to 100 mm. It is obvious that the mutual connections between the rods may be shaped in many ways. FIG. 5 merely illustrates the fundamental structure of the electrode.

Figure 6:
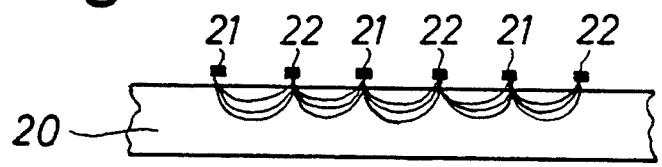
FIG. 6 is a diagrammatic, sectional view through the electrode assembly of FIG. 5 above a wooden building structure.

By means of the above electrode assembly an electric field essentially having the form illustrated in FIG. 6, is obtained. The term "fastoon electrode" derive from the filed configuration shown in FIG. 6. The "festoon" shaped field is obtained, because the the field is attracted by the lossy, dielectric building material (20) instead of the air above. This electrode assembly is used for treatment of for instance ceilings and floors, and floors having a thickness of up to 30 mm can be heated by this method.

Figure 7:
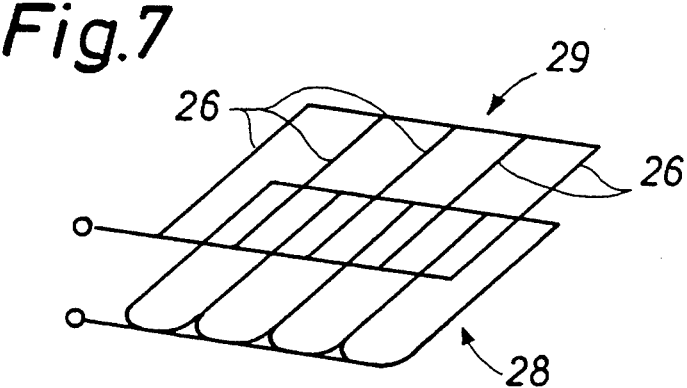
FIG. 7 is an Example of a set of electrodes.
Figure 8:
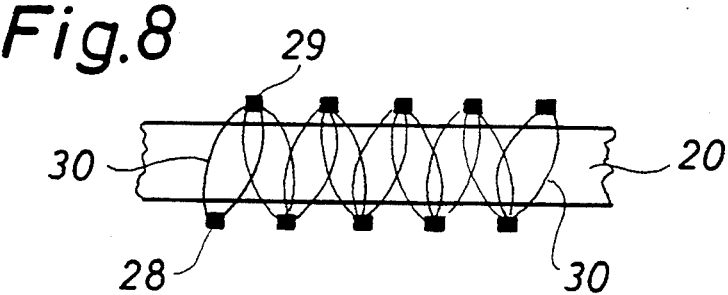
FIG. 8 is a diagrammatic sectional view through a set of electrodes as shown in FIG. 7 arranged on either side of the wooden building structure.

In yet another embodiment, shown in FIG. 7 and in a sectional view in FIG. 8, each of the electrodes may, furthermore, comprise its own series of parallel rods (26), whereby the electrodes are arranged on either side of the building structure requiring treatment, for instance a beam (20). The lowermost electrode (28) of FIG. 8 is preferably slightly displaced relative to the uppermost electrode (29) in such a way that a rod in the lowermost electrode (28) is arranged about halfway between two rods in the uppermost electrode (29).

As a result, a field assembly as illustrated in FIG. 8 is produced. The electrode rods are shown as black squares and the thin lines (30) between the rods indicate the electric field lines illustrating the occurring electric field.

Figure 9:
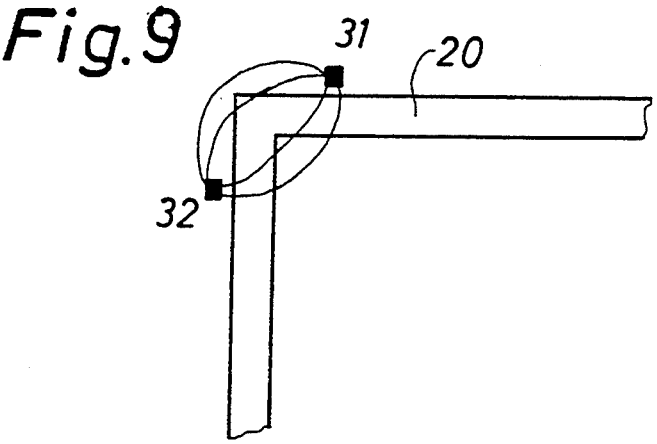
FIG. 9 is an Example of the arrangement of the electrodes by the treatment of a corner of a building structure.

In the treatment of corners it is advantageous to use an electrode structure comprising two parallel rods (31, 32) as shown in FIG. 9. This electrode structure produces a field which reaches completely out into the corner, even in cases, where access to the corner is difficult.

Figure 10:
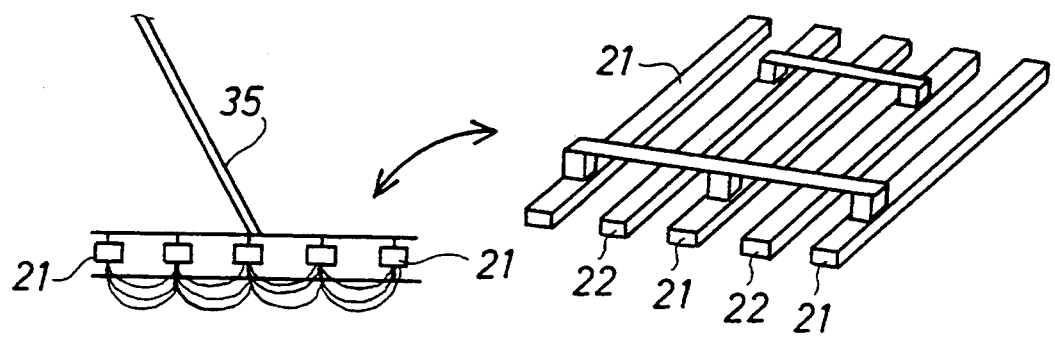
FIG. 10 is an Example of an electrode assembly for the treatment of a floor.

A electrode structure of the type illustrated in FIGS. 5 and 6 may, moreover, advantageously be provided with a shank (35) as illustrated in FIG. 10, whereby the complete structure may be used as a "broom" sweeping the floor.

Figure 11:
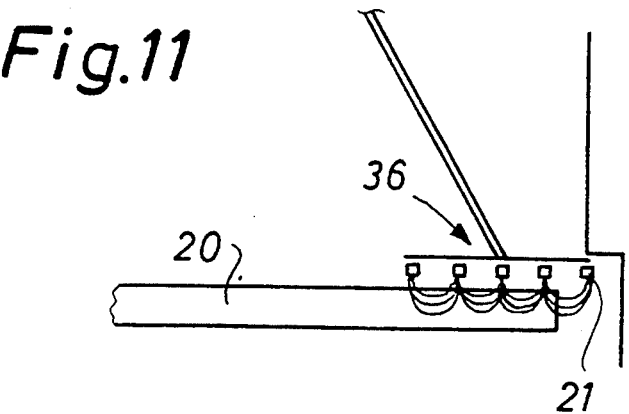
FIG. 11 is an Example of an electrode assembly for the treatment of the edge of a floor.

When treating a floor by means of this electrode "broom" (36), the skirting boards have to be removed to make room for a outermost electrode rod (21) completely outside the floor area, as illustrated in FIG. 11 to ensure that also the edge of the floor area (20) is sufficiently heated.

The equipment may also be used in connection with other types of damage to buildings, such as for combating longicorn beetles, and for drying of moist building foundations, brick walls, panels and other building structures. The method is furthermore usable for old wooden vessels.

The invention has been described with reference to a preferred embodiment. Many modification may, however, be carried out without deviating from the scope of the invention.

I claim:

1. A method for preventing and combating attack by fungus and other harmful living organisms in existing building structures contained in an existing building, comprising:

arranging a high frequency (HF) generator adjacent to the attacked area of the building structure, which building structure remains in place in the existing building; connecting a number of electrodes to the HF generator through HF supply lines; adapting and activating the HF-generator to supply a sufficiently strong HF-power (kW) which is dissipated in the treated area of the building structure, thereby heating the attacked area by means of electromagnetic energy to a temperature lethal to living organisms; and maintaining the high temperature for a predetermined period of time, characterized in that the electrodes are plate electrodes arranged on both sides of the attacked area of the building structure or part thereof in such a manner that the electrodes in combination form at least one capacitor, whereby at least part of the attacked area of the building structure constitutes the dielectric of the said at least one capacitor, using at least one frequency within a range of from 3 to 20 MHz, and thus heating the area to approximately 50° C. for at least one minute.

2. A method according to claim 1, characterized by heating the area to a temperature between 50° C. and 80° C. and maintaining the high temperature for a period of between 2 to 10 minutes.

3. A method according to claim 1 wherein the HF generator comprises a balanced output communicating with two essentially identical, rectangular electrodes through HF supply lines.

4. A method according to claim 1, wherein the electrodes are rectangular plate electrodes arranged on the same side of the building structure requiring treatment, a third electrically conducting plate being arranged on the opposite side of the building structure, said plate not being galvanically connected to the generator, but cooperating with the two electrodes and being arranged exactly opposite the two electrodes, whereby only the building structure requiring treatment separates the third plate from the two electrodes.

5. A method according to claim 1, wherein the electrodes comprise two essentially identical oblong rectangular electrically conducting plates, and are adapted to be connected with flat, wide ribbon conductors of the terminals of a Hf generator.

6. A method according to claim 5 wherein the electrodes comprise plates having a length of approximately 2 m and a width in the range of approximately 200 to 300 mm.

7. A method according to claim 6 wherein the electrodes comprise two essentially identical plates, each comprising a number of parallel, mutually connected adjacent rods, whereby each of the electrodes forms an essentially flat, rectangular grid surface.

* * * * *